R. B. WILLIAMSON.
DYNAMO-ELECTRIC MACHINE.
APPLICATION FILED APR. 5, 1920.

1,418,857.

Patented June 6, 1922.

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE.

1,418,857.      Specification of Letters Patent.      Patented June 6, 1922.

Application filed April 5, 1920. Serial No. 372,092.

*To all whom it may concern:*

Be it known that ROBERT B. WILLIAMSON, a citizen of the United States of America, residing at Milwaukee, in the county of Milwaukee and State of Wisconsin, has invented a certain new and useful Improvement in Dynamo - Electric Machines, of which the following is a specification.

This invention relates to dynamo electric machines and particularly that portion of such machines commonly known as the revolving field. More particularly the invention relates to a method and construction whereby the electrical connections to the field windings are brought down to slip rings or other means of connection.

One of the objects of the invention is the provision of a simple and efficient mode of bringing down such field connections. Another object is the provision of a construction whereby either the connections or the pole pieces or both may be readily removed and disassembled. Still another object is the provision of a construction whereby the connections are so located and constructed that the centrifugal strains thereon will be reduced to a minimum and those slight strains which remain are adequately provided against. Another object is the provision of a mode of construction of making such connections which will be very compact. Other objects will appear hereinafter as the description of the invention proceeds.

The novel features of the invention will appear from this specification and the accompanying drawings constituting a part thereof and embodying one form of the invention and all these novel features are intended to be pointed out in the claims.

Figure 1:
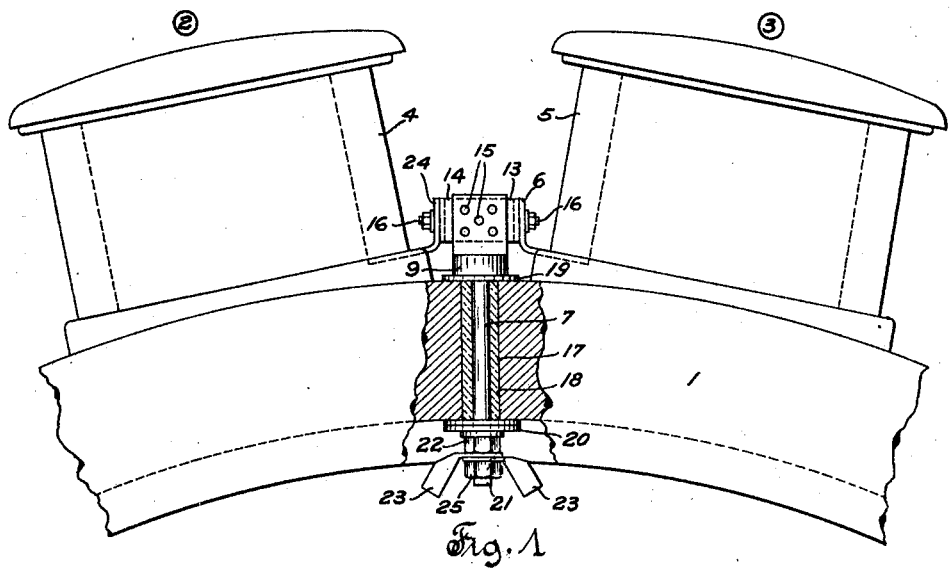

In the drawing, Fig. 1 is a fragment of a revolving field member in side elevation, a portion thereof being in section.

Figure 2:
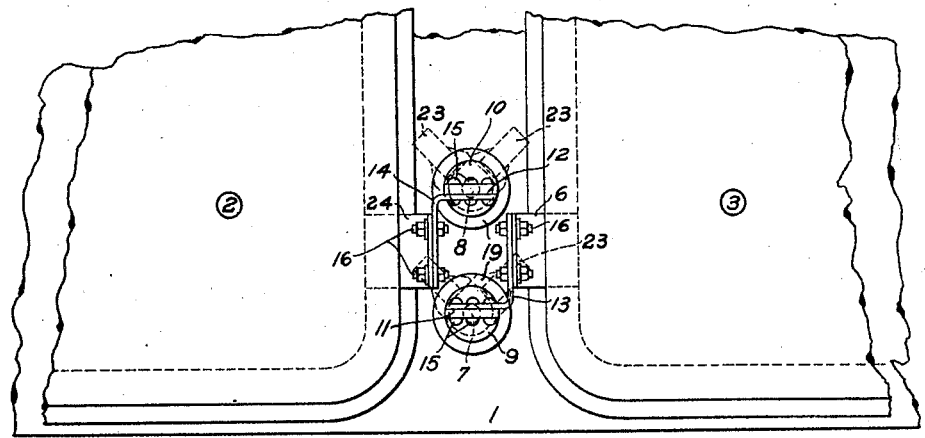

Fig. 2 is a plan view of what is shown in Fig. 1.

The revolving field member 1, which may be of annular form, is provided with any desired number of pole pieces. Two of the pole pieces 2, 3 are shown in the drawing and are provided with field windings 4, 5 respectively. In large machines such field windings are usually wound of ribbon-like conductors and one terminal each, 24, 6, of these ribbon conductors of the field windings 4, 5 is shown in the drawings. These terminals may, as is clearly shown in Fig. 2, be disposed opposite to each other. In order to bring the electrical connections to the field windings down to the usual slip rings (not shown) or other connecting means, in accordance with the present invention, the core 1 is provided with a desired number of holes 17 through which conducting rods or bolts 7, 8 may be passed. These rods are provided with heads 9, 10, here shown having flat connecting surfaces 11, 12 respectively. The rods 9, 10 are here shown as electrically connected with the field winding terminals 6, 24 respectively by means of conducting connectors 13, 14 which may, if desired, be riveted to the rod-heads by rivets 15 and bolted to the field winding terminals by bolts 16. In certain instances the terminals 6, 24 might be connected directly to the rod-heads.

The rods 9 and 10 are suitable insulated from the core 1 as by an insulating bushing 18 and insulating washers 19, 20. The rods 9, 10 have threaded ends 21, one of which is visible in Fig. 1 and a nut 22 may be used to tightly fasten the rod to the core. An electrical connection may be made to each rod by any desired number of terminal sockets 23 which may be fastened by means of nuts 25.

It will be noted that by reason of the present construction, as distinguished from prior constructions involving the use of strap conductors passing around the edge of and the side of the core, the parts may be readily and quickly disassembled in case it is desired to repair the pole pieces, or for any other purpose. At the same time, the large centrifugal strains involved in the use of strap conductors passing over the side of the core and the attendant strains on the winding terminals are avoided. It will also be noted that by reason of the relative location of the field winding terminals and the conducting rods a very compact construction is provided.

It should be understood that it is not desired to limit the invention claimed to the exact details of construction herein shown and described, for obvious modifications may occur to persons skilled in the art.

It is claimed and desired to secure by Letters Patent:

1. In a dynamo electric machine, a revolving field member of the type having a plurality of pole pieces mounted on a core and conducting leads for the field windings passing radially through said core and fastened thereto.

2. In a dynamo electric machine, a revolving field member having a core and a pair of pole pieces spaced apart, field windings on said pole pieces, a conducting lead passing radially through said core and fastened thereto and having means connectible to one of said windings disposed between said pole pieces.

3. In a dynamo electric machine, a revolving field member having a core and a pair of pole pieces spaced apart, field windings on said pole pieces comprising ribbon conductors, a conducting rod passing through said core between said pole pieces said rod being provided with a head at the end between said pole pieces and being threaded at the other end, a flat conducting member connecting said head and one of said ribbon conductors, and means engaging said threads for tightening said rod and for making electrical connection thereto.

4. In a dynamo electric machine, a revolving field member having a core and a pair of pole pieces spaced apart, field windings on said pole pieces comprising ribbon conductors, said conductor terminals emerging from said windings at substantially opposite points, two conducting rods passing through said core each rod being provided with a head, conducting means for connecting the heads to the respective field winding terminals and means for fastening said rods to said core.

5. In a dynamo electric machine, a revolving field member having a core and a pair of pole pieces spaced apart, field windings on said poles comprising ribbon conductors, the terminals of said conductors emerging from said windings at substantially opposite points, two conducting rods electrically connected to said conductor terminals passing through said core, and means for fastening said rods to said core.

6. In a dynamo electric machine, a revolving field member of the type having a plurality of pole pieces mounted on a core, means for making electrical connection to a field winding comprising a conducting rod passing through said core and fastened thereto said rod having a head having a flat connecting surface in a plane substantially parallel to the axis of the rod.

7. In a dynamo electric machine, a revolving field member having a core and a pair of pole pieces spaced apart, field windings on said pole pieces, a conducting rod passing through said core between said pole pieces, means for fastening said rod to said core, and means for electrically connecting said rod to a terminal of said field winding.

8. In a dynamo electric machine, a revolving field member having a core and a pair of pole pieces spaced apart, field windings on said pole pieces, a conducting rod passing radially through said core between said pole pieces, means for fastening said rod to said core, and means for electrically connecting said rod to a terminal of said field winding.

9. In a dynamo electric machine, a revolving field member having a core and a pair of pole pieces spaced apart, field windings on said pole pieces, a pair of conducting rods passing through said core between said pole pieces, means for fastening said rods to said core, and means for electrically connecting said rods to respective terminals of said field windings.

10. In a dynamo electric machine, a revolving field member having a core and a pair of pole pieces spaced apart, field windings on said pole pieces comprising ribbon conductors, said conductor terminals emerging from said windings at substantially opposite points, two conducting rods passing through said core between said pole pieces and on opposite sides of the general radial plane of said terminals, means for fastening said rods to said core, and means for electrically connecting said rods to respective terminals of said field windings.

11. In a dynamo electric machine, a revolving field member having a core and a pair of pole pieces spaced apart, field windings on said pole pieces comprising ribbon conductors, said conductor terminals emerging from said windings at substantially opposite points, two conducting rods passing through said core between said pole pieces and on opposite sides of the general radial plane of said terminals, said rods each having a head having a flat connecting surface in a plane substantially parallel to the axis of said rods, means for fastening said rods to said core, and means for electrically connecting said surface to respective terminals of said field windings.

12. In a dynamo electric machine, a revolving field member of the type having a plurality of pole pieces mounted on a core, means for making electrical connection to a field winding comprising a bolt passing through said core, said bolt having a head having a flat connecting surface, and a nut for said bolt for fastening the same to said core.

13. In a dynamo electric machine, a revolving field member of the type having a plurality of pole pieces mounted on a core, means for making electrical connection to a field winding comprising a bolt passing through said core, said bolt having a head having a flat connecting surface in a plane substantially parallel to the axis of the bolt, and a nut for said bolt for fastening the same to said core.

14. In a dynamo electric machine, a revolving field member of the type having a plurality of pole pieces mounted on a core, and field windings comprising ribbon conductors, means for making electrical connection to a field winding comprising a bolt passing through said core, said bolt having a head having a flat connecting surface, and a nut for said bolt for fastening the same to said core.

15. In a dynamo electric machine, a revolving field member of the type having a plurality of pole pieces mounted on a core and field windings comprising ribbon conductors, means for making electrical connection to a field winding comprising a bolt passing through said core, said bolt having a head having a flat connecting surface in a plane substantially parallel to the axis of the bolt, and a nut for said bolt for fastening the same to said core.

16. In a dynamo electric machine, a revolving field member of the type having a core and a pair of pole pieces spaced apart, field windings on said pole pieces comprising ribbon conductors, said conductor terminals emerging from said windings in an axial plane, two conducting rods passing radially through said core between said pole pieces, said rods each having a flat connecting surface in an axial transverse plane, and means for electrically connecting said connecting surfaces to respective terminals of said field windings.

In testimony whereof, the signature of the inventor is affixed hereto.

ROBERT B. WILLIAMSON.